Figure 1:
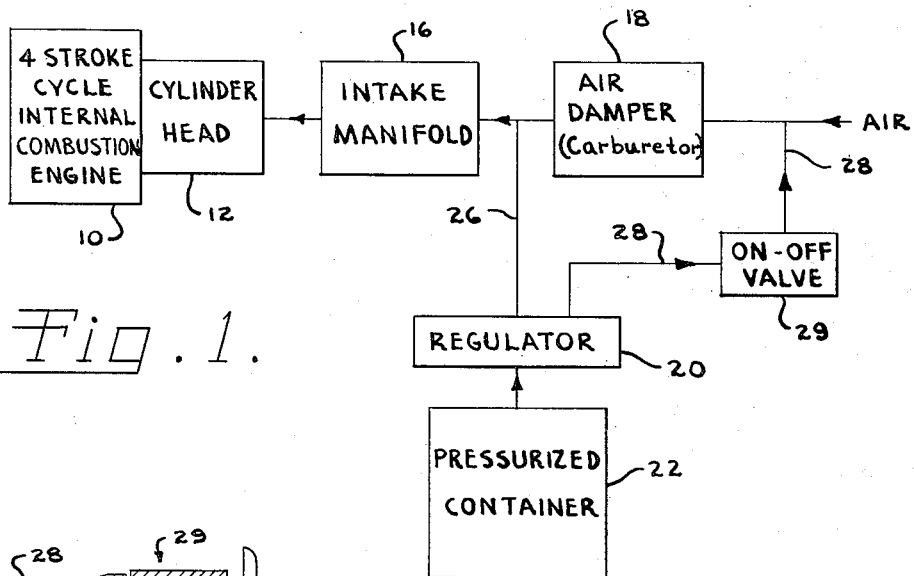

April 22, 1958

G. N. MILES ET AL 2,831,756

APPARATUS FOR SUPPLYING GASEOUS FUEL FROM
A CONTAINER OF PRESSURIZED GAS

Filed March 11, 1954

2 Sheets-Sheet 1

INVENTOR.
GEORGE N. MILES
HEINZ OLSCHNER

BY

James M. Relph
ATTORNEY

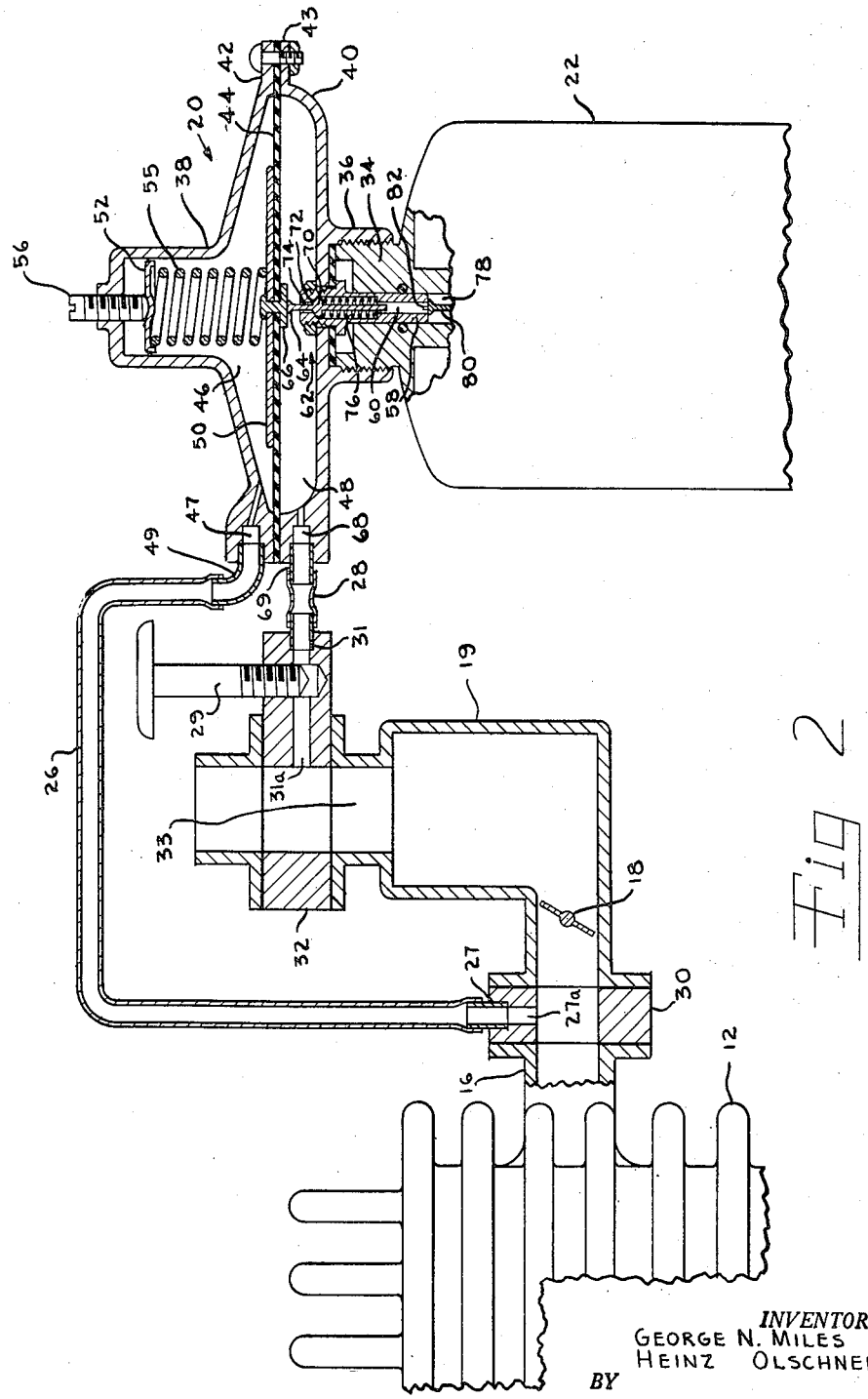

United States Patent Office 2,831,756
Patented Apr. 22, 1958

2,831,756

APPARATUS FOR SUPPLYING GASEOUS FUEL FROM A CONTAINER OF PRESSURIZED GAS

George N. Miles, Tenafly, and Heinz Olschner, Hasbrouck Heights, N. J., assignors to Otto Bernz Co., Inc., Rochester, N. Y., a corporation of New York Application March 11, 1954, Serial No. 415,596

3 Claims. (Cl. 48—184)

This invention relates to improvements in fuel supply apparatus for internal combustion engines, and particularly to an improved arrangement for supplying gaseous fuel to an internal combustion engine of the four-stroke-cycle type.

The gasoline burning, four-stroke-cycle internal combustion engine is continually being adapted to new uses, particularly in such apparatus as power lawn mowers and the like used about the home. While these engines generally are satisfactory, one of the principal objections to their use has been the necessity for handling gasoline as a fuel. For one thing, gasoline cannot be sent by mail or parcel post to isolated localities such as farms, country estates and the like. Therefore, the user must make arrangements to pick up the gasoline at intervals if it is used as a fuel. Furthermore, the storage of gasoline is something of a problem, as there are rather rigorous storage restrictions in some localities. Again, many users object to handling gasoline, with the likelihood of spillage in transfer from the container to the engine fuel tank.

There is, however, a readily available fuel which has none of the foregoing disadvantages, and which is well suited for use with internal combustion engines, particularly those of, say, one to three horsepower. This fuel is a hydrocarbon gas such as propane, butane or the like. With improved techniques for bottling such gases in liquid form in small, easily handled containers, the attractiveness of gaseous fuel for use with internal combustion engines increases greatly. This is particularly true in the case of currently available throw-away type containers of such gas that occupy very little storage space, that are clean and easy to handle, and that are approved for parcel post shipment by the Government agencies concerned. Aside from convenience of handling, this fuel has the additional advantage that it vaporizes readily and thereby facilitates engine starting.

On the other hand, the more commonly available engines of the type under consideration have been designed for burning gasoline, and require modification to operate on gaseous fuel.

Among the problems to be considered in the operation of an internal combustion engine on gaseous fuel is that of properly regulating and controlling the supply of fuel to the engine. For one thing, provision must be made to keep the gas supply rate reasonably independent of changes in gas pressure which accompany changes in the temperatures of the fuel container. A second problem is that of maintaining the correct mixture-ratio between the air and the fuel gas supplied to the engine so that the engine will idle properly without excessive fuel consumption, will accelerate quickly, and will operate smoothly at high speeds.

It is among the objects of the present invention to provide an improved apparatus for supplying gaseous fuel to a four-stroke-cycle internal combustion engine. Another object of the invention is to provide a simple and inexpensive assembly for readily adapting gasoline burning engines to utilize gaseous fuel, such assembly being particularly adapted for use with throw-away containers of liquified hydrocarbon gas.

In accordance with a preferred embodiment of the invention, the foregoing and other related objects are attained in a gaseous fuel supply apparatus which includes a simple gas regulation device adapted both to regulate the gas supply pressure and to control the flow of gaseous fuel as a function of the control of the air supplied to an internal combustion engine. More specifically, the regulator is arranged to respond to the difference in air pressure across the valve or damper which controls the supply of the air to the engine. In accordance with one feature of the invention, a simple assembly of parts is provided for readily adapting an engine designed for normal operation on gasoline to operate equally well on gaseous fuel.

Figure 2A:
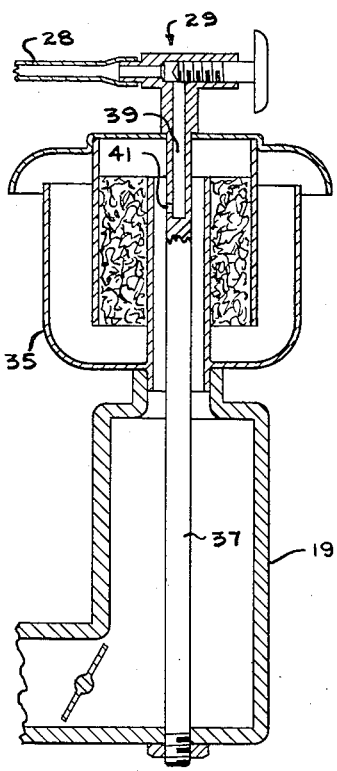
Figure 3:
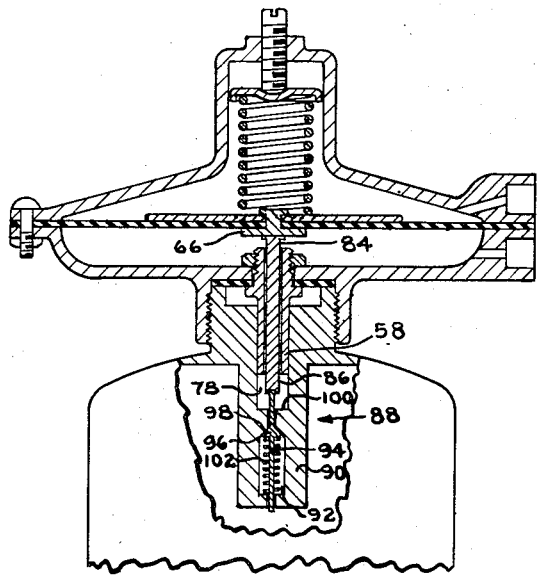

A more complete understanding of the invention, and of further objects and features thereof, can be had by reference to the following description of illustrative embodiments thereof, when considered in connection with the accompanying drawing, wherein, Figure 1 is a block diagram showing the general relationship between the parts in a system embodying the invention, Figure 2 is a side elevation, partly in section, showing in detail the parts in a system corresponding to that shown in Figure 1, Figure 2a illustrates an alternative connection of one of the regulator tubes in Figure 2, Figure 3 is a fragmentary view, similar to Figure 2, of a modified embodiment of the invention.

The system shown in Figure 1 includes a four-stroke-cycle internal combustion engine 10 having a cylinder head 12 which will be understood to include the usual intake valve (not shown) through which a mixture of air and fuel is supplied to the engine cylinder. In the usual case, this intake valve will be connected to an air-fuel supply system which includes an intake manifold 16. Upstream of the manifold 16, a gasoline-burning engine will include a carburetor for mixing air and fuel. The carburetor usually will include a butterfly valve or the like for controlling the flow of air to the engine. In an engine designed specifically for burning gaseous fuel, while no carburetor is required, the air intake again will include an air valve or damper. Accordingly, in the generalized case presently being considered, the system is shown to include an air damper 18 connected upstream of the manifold 16, it being understood that the damper 18 may be part of a carburetor.

In accordance with the present invention, there is provided a regulator 20 for controlling the supply of gas to the engine 10 from a container 22. As will be explained more fully hereinafter, the regulator 20 includes a pressure-sensing means for controlling the gas flow. A line 26 from the regulator to the downstream side of the damper 18 serves as one of the pressure-sensing connections for controlling the regulator. A second line 28 from the regulator to the upstream side of the damper 18 serves as a balancing or comparison pressure-sensing device. This second line 28 also functions to carry to the engine intake system the fuel gas which flows from the container into the regulator, and may include a fuel shut-off valve 29.

It will be understood that when the engine 10 is idling (with the air damper 18 substantially completely closed), there will be a relatively large pressure drop across the damper. The regulator 20 is so designed that this pressure difference will cause the regulator to cut down the flow of gas from the container 22 to the engine intake system.

Conversely, when the damper 18 is substantially fully open, as when the engine is operated at high speed, there will be a very low pressure drop across the damper 18. The regulator will respond to this decrease in pressure drop by allowing a larger quantity of gas to flow from the container 22 to the upstream side of the damper 18. Thus, it is seen that the arrangement of Figure 1 automatically provides for a relatively low gas flow rate when the air supply is cut down and the engine is idling. On the other hand, when the air input is increased at high engine speeds, the fuel flow will be increased to meet the increased demand.

In Figure 2, there is shown an arrangement embodying the present invention for adapting a gasoline engine to operate on gaseous fuel. The elements of the apparatus shown in Figure 2 include the engine cylinder head 12 connected to the intake manifold 16 in the usual fashion, the other parts of the engine being omitted for simplicity. Upstream of the manifold 16, at the point where the manifold normally would be assembled by flange connections to the carburetor, there is inserted a "pad" 30, providing communication between the air-fuel intake system and a tube 26 which terminates at a stub 27 opening into the pad through a port 27a. The tube 26 preferably is flexible, being made of neoprene rubber or the like, to be readily adaptable to different engine installations.

The air damper in this case comprises a butterfly valve 18 in the carburetor 19. On the upstream side of the carburetor 19 where a flange connection normally would be made to an air filter (not shown in Figure 2), a second pad 32 is inserted, providing communication, through a stub 31 and port 31a, between the carburetor air inlet port 33 and a second tube 28. Both tubes 26, 28 communicate with the regulator, as explained hereinafter. Also, the second pad 32 may include a manually operated valve 29 for turning the fuel supply on and off.

In some installations, where space limitations make it inconvenient to add the pad 32 to the intake, or where no mounting flange is available on the upstream side of the carburetor, an alternative connection for the tube 28 can be made through the air filter. Such an arrangement is shown in Figure 2a, wherein an air filter 35 upstream of the carburetor 19 is held in place by a central rod 37—a construction commonly found in gasoline burning engines. The connection for the tube 28 is made by replacing the conventional solid rod with a rod 37 that is drilled out for a portion of its length to provide a passage 39 communicating between the tube 28 and a side port 41 in the rod. The port 41 opens into the air filter portion of the carburetor air intake line. The on-off valve 29 conveniently is mounted on the upper end of the rod 37 between the tube 28 and the rod passage 39.

Referring again to Figure 2, the fuel supply container comprises a metal bottle 22 having a reduced diameter, threaded neck 34 to which the regulator is adapted to be assembled by means of a threaded socket 36.

The regulator 20 comprises a housing made up of upper and lower sections 38, 40 fitted together at abutting flanges 42, 43. A flexible diaphragm 44, clamped between the upper and lower housing flanges, extends across and divides the space inside the housing into upper and lower compartments 46, 48.

In the upper compartment 46, a spring 55 extends from a pressure plate 50 on the upper face of the diaphragm 44 to a retaining cup 52 contacting an adjusting screw 56 which is threaded in the upper housing section 38. Also, the tube 26 communicates with the upper compartment 46 through a port 47 and a stub 49 in the flange 42.

Inside the socket 36, a hollow rod 58 projects downwardly from the lower housing section 40, defining a passageway 60 communicating with the lower compartment 48. Inside this passageway is located a spring-loaded valve 62 having a stem 64 which contacts a plate 66 on the underface of the diaphragm 44 in the compartment 48. The tube 26 from the upstream side of the carburetor also communicates with the compartment 48 through a port 68 and a stub 69 in the flange 43.

The valve stem 64 has an enlarged portion 70 with a tapered upper surface 72 forming a valving member cooperable with the correspondingly tapered undersurface of a shoulder 74 which forms a seat at the upper end of the passageway 60. A spring 76 normally urges the stem 64 upwardly, tending to bring the closure member 70 into contact with the seat 74.

When the fuel bottle 22 is screwed into the socket 36, the rod 58 projects into an opening 78 in the neck of the container to contact and depress the stem 80 of a valve (not shown in Figure 2) in the container, thereby opening the valve to release gas from the container. The gas then will flow from the container 22 through slots 82 in the end of the rod 58 and through the passageway 60 into the compartment 48.

It can be seen that the rate of flow of gas from the bottle 22 will be determined by the gas pressure in the bottle and the flow area through the valve 62. In turn, the valve opening will depend on the position of the diaphragm 44, which is influenced by several forces. Those of principal importance are the force exerted by the spring 55, and the resultant of the pressures acting on the upper and lower faces of the diaphragm 44. Another minor force is that exerted by the valve stem 64, which combines the force of the valve spring 76 and the gas pressure acting on the enlarged portion 70 of the valve stem 64.

When the engine is running, the pressure on the upperface of the diaphragm will be determined by the intake manifold pressure. This, in turn, will depend primarily on the setting of the butterfly valve 18. With the butterfly set for minimum air flow to the engine, maximum negative pressure will be transmitted to the diaphragm upperface. As the butterfly is opened, this pressure will become less negative until the throttle is fully open, when the pressure drop across the valve 18 is at a minimum and the pressure transmitted to the upper housing chamber 46 reaches its minimum negative value.

The pressure in the lower chamber 48 will stay essentially constant, because there will be little change in pressure at the outlet end of tube 28 and any changes in bottle pressure will be self-compensating. That is, any increase in bottle pressure will have an effect both on the force transmitted to the diaphragm through the valve stem and on the pressure in the lower chamber 48. The result of this will be an appropriate (slight) movement of the diaphragm, changing the flow area through the valve 62 in such direction as to compensate for the change in bottle pressure.

With the foregoing analysis of the chamber pressures in mind, the action of the diaphragm 44 and of the valve 62 during engine operation can be understood readily. The spring 55 is adjusted manually by the screw 56 to open the valve 62 the correct amount for smooth operation of the engine at maximum speed. This adjustment, of course, will correspond to maximum fuel demand. At this time, the throttle valve 18 will be fully open, so that the pressure drop across the valve 18 will be negligible. In other words, the adjusting screw will be set for maximum fuel flow when the pressure on the upperface of the diaphragm has its minimum negative value.

When the valve 18 is closed to throttle down the engine, the pressure drop across the valve 18 will increase. This will result in a higher negative pressure on the upper face of the diaphragm, which will flex the diaphragm upwardly and partially close the gas valve 62. Accordingly, the fuel input will be reduced to give economical fuel consumption at low engine speeds. Now if the throttle valve 18 is opened suddenly, calling for rapid acceleration of the engine, the pressure drop across the valve 18 will decrease, thereby decreasing suddenly the negative pressure in the upper chamber 46. This will open the valve 62 quickly, giving a corresponding sudden increase in the flow of gas through the line 28. Since the flow of air through the carburetor will not increase as rapidly as will the gas flow, the engine will receive a relatively rich air-fuel mixture such as is best for smooth, rapid acceleration. As the engine picks up speed, however, and the air flow through the carburetor gradually increases, the mixture will gradually lean out to more suitable proportions for high speed operation, although the gas flow itself will not change appreciably.

Thus, it can be seen that the gas supply system of the present invention is arranged to give the proper air-fuel mixture under all conditions of operation with maximum fuel economy, and that compensation is also provided for changes in bottle gas pressure.

As was previously mentioned, the throw-away type gas container customarily includes a valve in the gas outlet passage which is opened by a projecting rod on the fitting to which the bottle is assembled. In some instances, this bottle valve is a spring-loaded valve quite similar to that used in the regulator of Figure 2, and, therefore, is suitable for use as a regulating valve. In accordance with a further feature of the invention, the valve 62 in the regulator 20 of Figure 2 can be eliminated in such instances, the bottle outlet valve being used in its place.

Such an arrangement is shown in Figure 3 of the drawing, wherein only those parts are shown which differ from the system already described in Figure 2.

In the Figure 3 embodiment, a stem 84 extends from a plate 66 on the underface of the diaphragm through the passageway 60 in the hollow rod 58. The lower end 86 of the stem 84 projects slightly from the lower open end of the hollow rod 58 and has a dished end which contacts the stem of the bottle valve 88.

The bottle valve 88 comprises a body 90 having a longitudinal passageway 92 which communicates between the inside of the bottle and the neck opening 78. In this passageway 92 is located a stem 94 having an enlarged portion 96 intermediate its ends with a tapered upper surface 98 forming a valving member adapted to seat against the correspondingly tapered undersurface of a shoulder 100 forming a seat in the passageway 92. A spring 102 urges the stem 94 upwardly to bring the valving member 96 into contact with the seat 100 when the valve is to be closed.

The operation of the apparatus in Figure 3 is substantially the same as that in the Figure 2 embodiment, with the exception that in the Figure 3 construction the regulating action takes place in the bottle valve 88, as controlled by flexing of the diaphragm. In this case, of course, the motion of the diaphragm is transmitted to the valve stem through the actuating stem 84.

We claim:

1. Apparatus for supplying gaseous fuel from a container of pressurized gas to an internal combustion engine of the type having an air intake system including damper means for controlling the flow of air through said system, said apparatus comprising means defining a passage communicating with the interior of said pressurized gas container for conducting gas from said container to said intake system on the upstream side of said damper means, and means including a normally open valve in said passage for regulating the flow of gas through said passage in accordance with the air pressure drop across said damper means, said last-named means including an air-tight housing, a flexible diaphragm extending across and dividing the space inside said housing into two compartments, one of said compartments comprising a portion of said passage, said diaphragm being so coupled to said valve as to decrease the opening of said valve upon movement of said diaphragm away from said one compartment, and means for communicating the other of said compartments with said intake system on the downstream side of said damper means.

2. Apparatus as defined in claim 1 wherein said housing includes a socket for attaching said housing to a throw-away-type fuel container having a threaded neck for screwing into said socket, said fuel container further being of the type having a normally closed, spring-loaded valve located in a passageway in said neck and adapted to be opened upon attachment of said container to said socket by contact with an actuating stem protruding in said socket, said regulating means including said stem extending from one face of said diaphragm and through said socket for contacting said valve, thereby (1) to open said valve upon attachment of said container to said socket and (2) to control the amount of opening of said valve in accordance with the position of said diaphragm.

3. In an apparatus for supplying gaseous fuel from a container of pressurized gas to a four-stroke-cycle internal combustion engine of the type having an air intake system including damper means for controlling the flow of air through said system, a regulator comprising an air-tight housing, a flexible diaphragm extending across and dividing the space inside said housing into two compartments, means connecting the interior of said container to the interior of said housing, means defining a passage for conducting gas from said container to one of said housing compartments, valve means in said passage coupled to said diaphragm for controlling the flow of gas through said passage in accordance with the position of said diaphragm, a tube communicating said one compartment with said intake system on the upstream side of said damper means, said diaphragm being operative to decrease the opening of said valve upon movement of said diaphragm away from said one compartment, and a second tube communicating the other of said compartments with said intake system on the downstream side of said damper means.

References Cited in the file of this patent

UNITED STATES PATENTS

| 1,250,319 | Keith | Dec. 18, 1917 |
| 1,301,272 | Keith | Apr. 22, 1919 |
| 1,684,500 | McKee | Sept. 18, 1928 |
| 2,245,485 | Lewis | June 10, 1941 |
| 2,258,003 | Dickson | Oct. 7, 1941 |
| 2,354,283 | St. Clair | July 25, 1944 |
| 2,463,493 | Norway | Mar. 1, 1949 |
| 2,683,084 | Garretson | July 6, 1954 |
| 2,698,226 | Peduzzi | Dec. 28, 1954 |

FOREIGN PATENTS

| 508,126 | Belgium | Jan. 15, 1952 |
| 433,206 | Germany | Aug. 24, 1926 |